United States Patent
Forstadius et al.

(10) Patent No.: US 7,200,130 B2
(45) Date of Patent: Apr. 3, 2007

(54) SHORT RANGE RF NETWORK CONFIGURATION

(75) Inventors: Antti Forstadius, Tampere (FI); Tomi Heinonen, Tampere (FI); Jari Leppänen, Nokia (FI)

(73) Assignee: Nokia Corporation, Espoo (FI)

( * ) Notice: Subject to any disclaimer, the term of this patent is extended or adjusted under 35 U.S.C. 154(b) by 897 days.

(21) Appl. No.: 09/781,990

(22) Filed: Feb. 13, 2001

(65) Prior Publication Data

US 2002/0154607 A1    Oct. 24, 2002

(51) Int. Cl.
*H04Q 7/24* (2006.01)

(52) U.S. Cl. .................................... 370/338; 370/401
(58) Field of Classification Search ............... 370/338, 370/254, 349, 351, 312, 310, 389, 400, 401, 370/432
See application file for complete search history.

(56) References Cited

U.S. PATENT DOCUMENTS

| | | | | |
|---|---|---|---|---|
| 5,224,150 A * | 6/1993 | Neustein | .................... | 340/7.44 |
| 5,473,667 A * | 12/1995 | Neustein | .................... | 340/7.29 |
| 5,654,959 A * | 8/1997 | Baker et al. | ................. | 370/331 |
| 5,673,031 A * | 9/1997 | Meier | .......................... | 340/2.4 |
| 5,787,174 A * | 7/1998 | Tuttle | .......................... | 713/189 |
| 5,812,531 A * | 9/1998 | Cheung et al. | ............. | 370/255 |
| 5,973,613 A * | 10/1999 | Reis et al. | ................... | 340/7.23 |
| 6,006,090 A | 12/1999 | Coleman et al. | ............ | 455/432 |
| 6,046,992 A | 4/2000 | Meier et al. | ................. | 370/338 |
| 6,104,279 A * | 8/2000 | Maletsky | ................. | 340/10.41 |
| 6,104,333 A * | 8/2000 | Wood, Jr. | .................... | 341/173 |
| 6,195,006 B1 * | 2/2001 | Bowers et al. | ............ | 340/572.1 |
| 6,314,091 B1 * | 11/2001 | LaRowe et al. | ............. | 370/338 |
| 6,421,731 B1 * | 7/2002 | Ciotti et al. | ................. | 709/238 |
| 6,452,910 B1 * | 9/2002 | Vij et al. | ..................... | 370/310 |
| 6,459,685 B1 * | 10/2002 | Mahe | ......................... | 370/313 |
| 6,459,894 B1 * | 10/2002 | Phillips et al. | .............. | 455/424 |
| 6,490,687 B1 * | 12/2002 | Nagai | ......................... | 713/202 |
| 6,535,498 B1 * | 3/2003 | Larsson et al. | ............. | 370/338 |
| 6,549,786 B2 * | 4/2003 | Cheung et al. | ............. | 455/524 |
| 6,636,737 B1 * | 10/2003 | Hills et al. | .................. | 455/450 |
| 6,717,516 B2 * | 4/2004 | Bridgelall | ................ | 340/572.1 |

(Continued)

FOREIGN PATENT DOCUMENTS

JP          11-272997          3/1998

(Continued)

*Primary Examiner*—Chau Nguyen
*Assistant Examiner*—Andrew C. Lee
(74) *Attorney, Agent, or Firm*—Morgan and Finnegan, LLP

(57) ABSTRACT

A network including a host device and a plurality of transceiver satellite nodes for communicating data from terminal devices interacting with the nodes, to the host. The nodes include identification codes used by the host for establishing wireless communication links either between a node and the host, or between two or more nodes. The host includes a data store for storing identification codes of nodes. The host pages the nodes by their identification codes and, upon establishing communication with a node, the list of identification codes is passed to the node, which then pages other nodes which may be out of range of the host, which then receive the list and may page yet other nodes, until all listed nodes are linked into the network. A tag reader is connected or connectable to the host for reading tags associated with nodes and thereby capturing the identification codes of the nodes.

53 Claims, 4 Drawing Sheets

U.S. PATENT DOCUMENTS

| | | | |
|---|---|---|---|
| 6,754,250 B2 * | 6/2004 | Haartsen | 375/132 |
| 6,763,231 B2 * | 7/2004 | Takatori et al. | 455/420 |
| 6,775,258 B1 * | 8/2004 | van Valkenburg et al. | 370/338 |
| 6,795,688 B1 * | 9/2004 | Plasson et al. | 455/41.2 |
| 6,826,165 B1 * | 11/2004 | Meier et al. | 370/338 |
| 6,831,896 B1 * | 12/2004 | Heinonen et al. | 370/252 |
| 6,885,847 B1 * | 4/2005 | Lumelsky | 455/41.2 |
| 6,904,275 B2 * | 6/2005 | Stanforth | 455/343.1 |
| 6,925,074 B1 * | 8/2005 | Vikberg et al. | 370/338 |

FOREIGN PATENT DOCUMENTS

| | | |
|---|---|---|
| WO | 94/15413 | 7/1994 |
| WO | 98/17032 | 4/1998 |
| WO | WO 98/19400 | 5/1998 |
| WO | 98/2764 | 6/1998 |
| WO | 98/35453 | 8/1998 |
| WO | 99/21095 | 4/1999 |
| WO | 00/18025 | 3/2000 |
| WO | WO 00/69186 | 11/2000 |
| WO | WO 01/13660 | 2/2001 |
| WO | WO 01/28156 A2 | 4/2001 |
| WO | WO 01/28157 A2 | 4/2001 |
| WO | WO 01/43362 | 6/2001 |
| WO | WO 01/43371 | 6/2001 |
| WO | WO 01/43372 | 6/2001 |

* cited by examiner

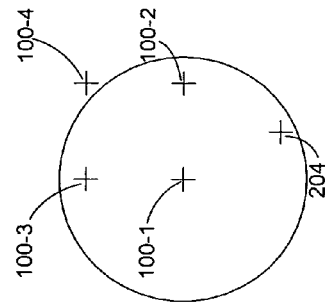
Fig 4C
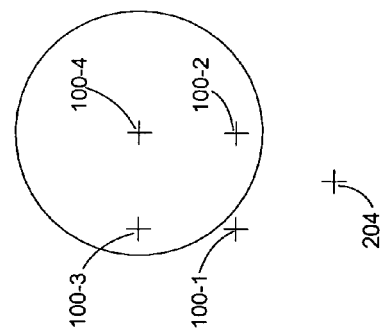
Fig 4F
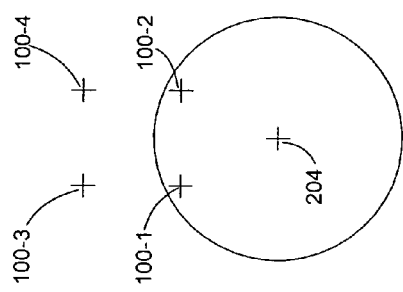
Fig 4B
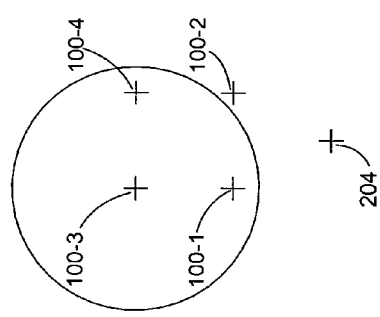
Fig 4E
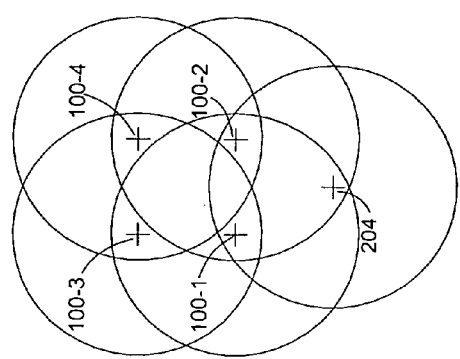
Fig 4A
Fig 4D

SHORT RANGE RF NETWORK CONFIGURATION

CROSS-REFERENCE TO RELATED APPLICATIONS

This application is related to application 09/614,508, filed Jul. 11, 2000, and assigned to common assignee herewith.

BACKGROUND OF THE INVENTION

1. Field of the Invention

The present invention relates to short-range RF networks and, more particularly, to dynamic configuration of nodes in short range RF networks.

2. Description of the Related Art

The availability of various types of communication devices produces a need to have these devices interact with each other in a manner which is cost efficient and which can be easily implemented. Such communication can occur between two or more terminal devices 216 (e.g. telephones, computers, printers, facsimile machines, personal digital assistants (PDAs), etc.) as shown in FIG. 2 by wired connection such as by connecting electrical conductors to the devices, or by wireless communication using infrared signals or wireless frequency (RF) signals. For many applications, RF signals are preferred as they do not require line-of-sight interaction between a transmitter and a receiver of a terminal device pair.

Recently, low power RF systems have been proposed for providing communications between a plurality of transceivers through a short range link having a broadcast range of several meters. One such local RF system is currently under development and is referred to as "Bluetooth". This system will be commercially available in the near future and is designed to operate in the open spectrum, (around 2.4 gigahertz). The Bluetooth system will allow for devices such as mobile phones, computers, and other types of terminal devices 216 in FIG. 2 which are located within an operable range of the RF system to communicate with each other.

Wireless relay networks also exist which, in effect, extend an operating range of a local RF system by utilizing relay devices to interface with and provide communication between two or more terminal devices 216 in FIG. 2. Such a network is disclosed in PCT Application No. WO 98/17032 wherein a plurality of communication nodes are wirelessly connected to each other and to a host device for providing numerous communication links for data to be communicated between the host and terminal devices 216 in FIG. 2 interfaced with the nodes. A drawback of such a system, however, is that it requires manual entry of configuration information when the complement of relay devices is established or altered. Another drawback of such a system is that a foreign relay device can insinuate itself into a network.

SUMMARY OF THE INVENTION

To overcome limitations in the prior art described above, and to overcome other limitations that will be apparent upon reading and understanding the present specification, the present invention is directed to a short range RF network having routing capabilities for communicating data between one or more terminal devices and/or one or more hosts among a select one of a plurality of communication paths. The inventive network includes a plurality of wireless transceiver nodes and one or more host devices, each equipped with a data storage device, also called a data store or a memory unit. To initialize the network, the host's data store is loaded with data identifying each of the nodes. The host then pages the nodes using their identification data. Although some nodes may be outside the range of the host, those that are within range will answer and establish communication with the host. Those nodes within range of the host then receive the list of identifications of all of the nodes, and store the list in their data stores. Those nodes then page the other nodes to find some of the nodes beyond the range of the host but within their own range. In successive iterations of the process, all nodes are found and linked into the network. All node-to-node paths are identified.

One embodiment of the invention is a method of configuring an RF network, the network comprising at least two nodes, each having a controller, a data store, and at least one transceiver for communicating with other nodes, each transceiver having a unique identifier. The method comprises the steps of: (a) assigning a predetermined value to a variable n; (b) selecting one certain of the nodes and associating it with the value of n; (c) paging all other nodes from a node associated with the value of n; (d) in a node associated with the value of n, noting nodes which reply to paging and associating them with the value of (n+1); (e) making all nodes associated with the value of n or with lower values unresponsive to paging; (f) incrementing the value of n; and (g) repeating steps (c) through (f) until no nodes reply to paging; whereby nodes beyond transmission range of other nodes but within transmission range of intermediate nodes become known to said other nodes and become accessible to said other nodes by relaying through said intermediate nodes.

Another embodiment of the invention is a method of configuring an RF network, the network comprising a plurality of network nodes for communicating with other nodes, each having a controller unit and a data store, the method comprising the steps of: a) storing identifiers of all nodes on the network in a data store accessible to at least one node; b) paging from the at least one node other nodes; c) detecting other nodes within the coverage area of the at least one node by receiving responses of said detected nodes to paging; d) updating information regarding said detected nodes according to the received responses of said detected nodes to paging; e) associating said detected nodes with a first value of a dynamic variable, the value of the dynamic variable depending on the placement of each said detected node in the network; and f) propagating the updated information to said detected nodes in the network.

Another embodiment of the invention is a self-configuring RF network comprising: a plurality of nodes for communicating wirelessly with other nodes of the RF network, wherein at least one of the nodes is selected as a control node, each node including: a control logic; a data store connected to the control logic; at least one transceiver connected to the control logic and identified by a unique address for communicating wirelessly with other nodes of the network; a transceiver list database connected to the data store for storing updateable information of all transceivers of the RF network for network configuration; and a dynamic variable linked to the transceiver list database for indicating position of each node in the RF network relative to the control node.

Another embodiment of the invention is a node for use in a self-configuring RF network, comprising: a backbone transceiver identified by a unique address and associated with a password, for communicating with other nodes of the network; and control logic configured to detect when the backbone transceiver receives a paging message directed to its unique address, and in response, to direct that: a password received in the paging message be verified as the password associated with the backbone transceiver; a node transceiver list received in the paging message, containing addresses and passwords of other nodes in the network, be received and stored; a value "n" of a dynamic variable received in the paging message be received and stored; and the node becomes unresponsive to further paging messages.

Another embodiment of the invention is a self-configuring RF network comprising: a plurality of nodes for communicating wirelessly with other nodes of the RF network, wherein at least one of the nodes is selected as a control node, each node including: a control logic; a data store connected to the control logic; at least one transceiver connected to the control logic identified by a unique address for communicating wirelessly with other nodes of the network either directly or through one or more relay nodes; and software means operative on the control logic for: maintaining in the data store a transceiver list database containing updateable information of all transceivers of the RF network for network configuration; indicating, with a dynamic variable linked to the transceiver list database, position of each node in the RF network in relation to the control node; periodically communicating wirelessly among the nodes of the RF network for exchanging updated configuration information and dynamic variable information; and updating current network configuration information and dynamic variable information within the data store.

Another embodiment of the invention is a method of configuring an RF network, the method comprising the steps of: electronically maintaining, for network configuration, a transceiver list database containing updateable information regarding all transceivers of the RF network; indicating position of each node in RF network in relation to a control node with a dynamic variable linked to the transceiver list database; periodically communicating wirelessly to between nodes of the RF network for exchanging updated configuration information and dynamic variable information; and updating current network configuration information and dynamic variable information within the transceiver list database.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals denote similar elements throughout the several views:

FIG. 4 shows physical positions and RF coverage areas for the embodiment which is block-diagrammed in FIG. 2.

DETAILED DESCRIPTION OF THE PRESENTLY PREFERRED EMBODIMENTS

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
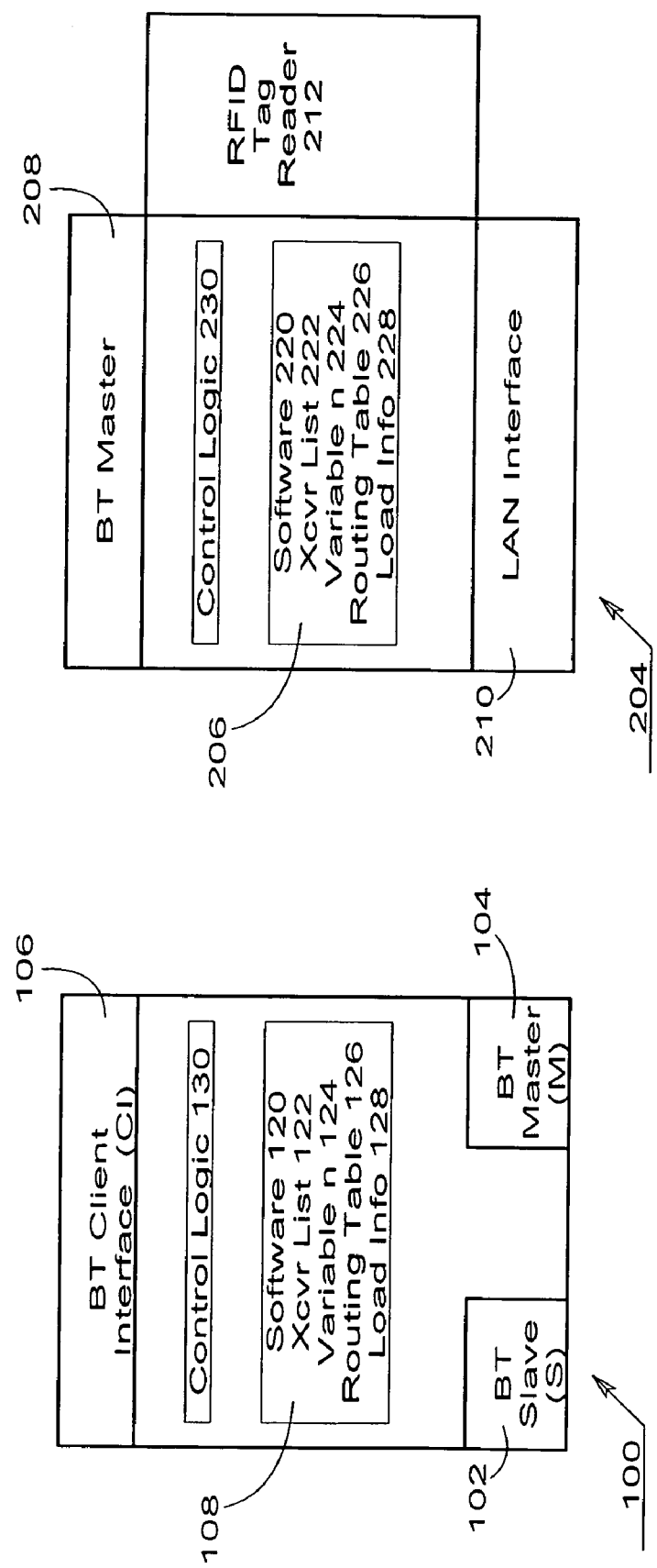
FIGS. 1A and 1B are block diagrams of short-range RF relay devices for use with one embodiment of the present invention.

FIG. 1A is a block diagram of a short-range radio-frequency (RF) relay device 100 for use as a node in a short-range RF network according to one embodiment of the present invention. Each node 100 is equipped with at least one RF communication circuit. In one embodiment, the RF communication circuits are integrated-circuit chips conforming to the Bluetooth (BT) specification. Every node 100 is equipped with a chip 102 which, by means to be described below, becomes a slave (S). A slave chip receives and responds to paging messages from a network host node or from other nodes 100. In a present embodiment, the paging messages do not necessarily conform to the standards set forth in the Bluetooth specification. A node 100 may also be equipped with a second chip 104 to serve as a master (M), which may page other nodes 100. Chips 102 and 104 enable a node 100 to be a node on a network backbone. The allocation shown in FIG. 1A of chip 102 as slave and chip 104 as master is merely exemplary. The determination of which functions as the slave and which as the master is made at the time of initializing the network, to be discussed further below. In an alternative embodiment, a single chip may participate in two networks in a multiplex manner, sometimes functioning in one "piconet" and sometimes in the other. The composite of the two or more piconets is known as a "scatternet".

Chip 106 is included in a node 100 as a client interface (CI) for commnicating with user terminal devices. In an alternative embodiment, one or more of the network backbone chips may function as the client interface using the previously mentioned multiplexing technique. Most nodes 100 are equipped with a chip 106, although a node that is not so equipped may still be part of the backbone of a network 100, relaying messages to and from other nodes 100 in a network. A node 100 is also equipped with a data store 108 where electronic data can be stored. Many forms of storage are known to those in the art, such as electronic RAM, disk drives, etc. In a present embodiment, data store 108 contains software 120, transceiver list 122, a variable "n" 124, routing table 126, and load information 128. A node 100 also includes control logic 130, which may be directed at least in part by software 120.

FIG. 1B is a block diagram of a short-range RF device 204 for use as a host node according to one embodiment of the present invention. It includes a data store 206, analogous to data store 108 of relay device 100. Control logic 230 is analogous to control logic 130 of device 100. Other features of host 204 will be discussed in connection with the ensuing discussion of FIG. 2.

The overall purpose of a network according to the present invention is to enable a plurality of users with terminal devices (e.g., mobile phones) to communicate with a host computer or with one another. The coverage area of a short-range RF chip is typically in the range of 5 to 100 meters. To allow users to communicate while roaming through a distance larger than the coverage area of a single node, networks typically provide a number of nodes deployed so that their coverage areas overlap.

Figure 2:
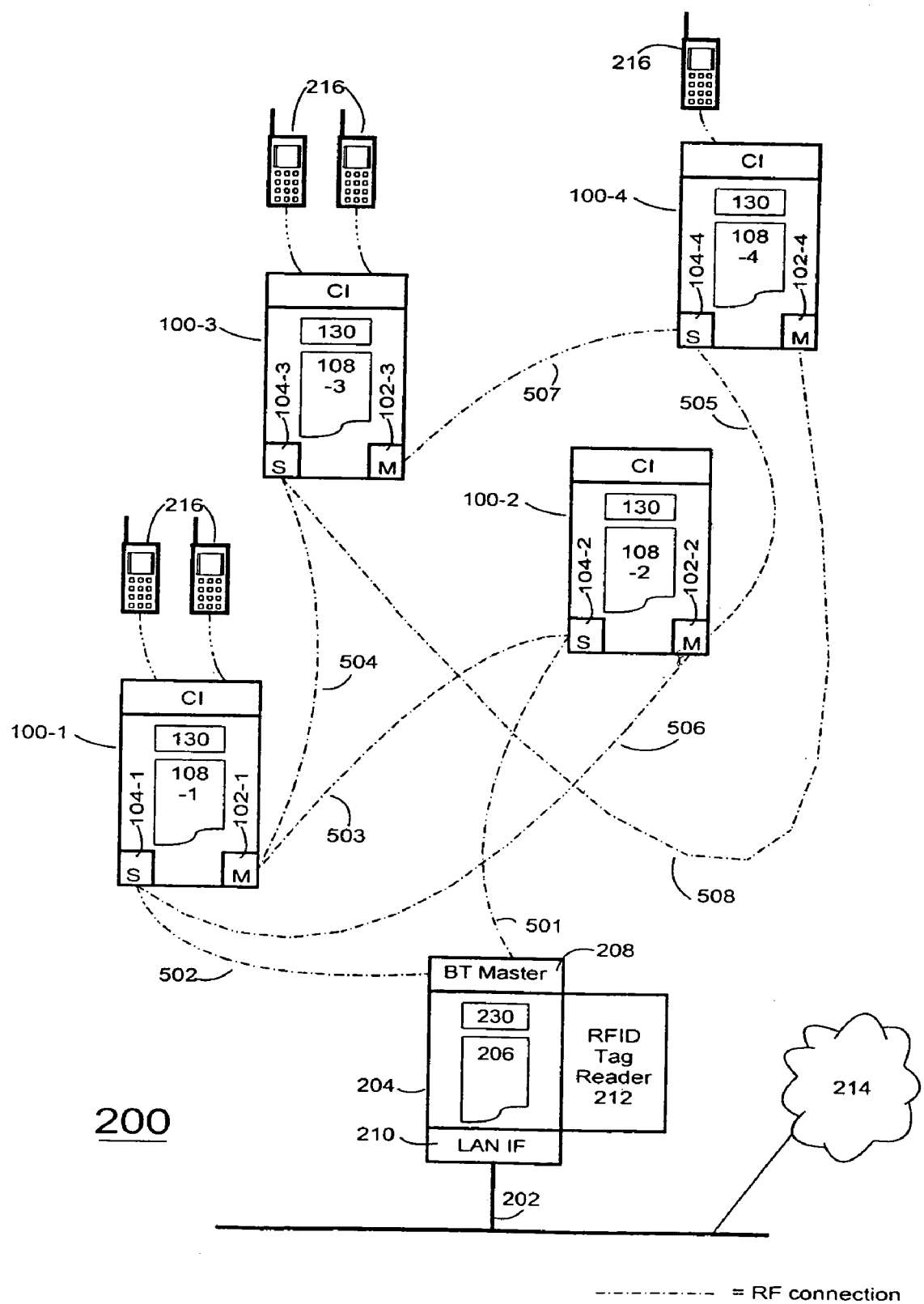
FIG. 2 is a block diagram of a short-range RF network according to one embodiment of the present invention.

FIG. 2 is a block diagram of one embodiment of the invention, a short-range RF network 200 employing a network host 204 and four nodes 100 (denoted 100-1 through 100-4). Those in the art realize that the host is also a node on the network, but is called by the name "host" because of its special role. This network 200 is exemplary, and nothing inherent in the invention constrains a network 200 to four nodes or to the particular configuration shown in FIG. 2. The number of nodes 100 is determined according to the coverage area of each node 100 and the total coverage area to be covered by the network 200. Network host 204 is equipped with at least one short-range RF communication circuit 208 which in this embodiment is a Bluetooth chip and is a master in that it may initiate pages to nodes 100. Network host 204 is also equipped with a LAN interface 210 and is thereby in communication with LAN 202. Other entities may communicate with network host 204 through LAN 202, including Internet 214. Network host 204 includes data store 206, which may be any data storage means such as electronic RAM or a disk drive. Contained in data store 206 are software 220, transceiver list 222, variable "n" 224, routing table 226, and load information 228. Host 204 and nodes 100 also each include control logic 230 and 130 respectively for controlling and coordinating actions according to predetermined logical rules represented in firmware or software including software 220, as is known in the art.

In this embodiment, network host 204 is also equipped with radio-frequency identification tag (RFID tag) reader 212. According to the present invention RFID tag reader 212 is used to read information which will be used to identify the backbone communication chips 102, 104 in nodes 100 which belong to the network 200, and conversely to exclude nodes which do not belong to the network 200. In alternative embodiments, other types of readers may be used, such as barcode readers. Tag reader 212 may be permanently wired to network host 204 or alternatively may be detachable from network host 204 for security reasons or so that it may be used with other network hosts. The system may be used without a tag reader 212, in which case the identification information can be manually input through a keyboard (not shown) or read from some other media (not shown) such as floppy disk.

Figure 3:
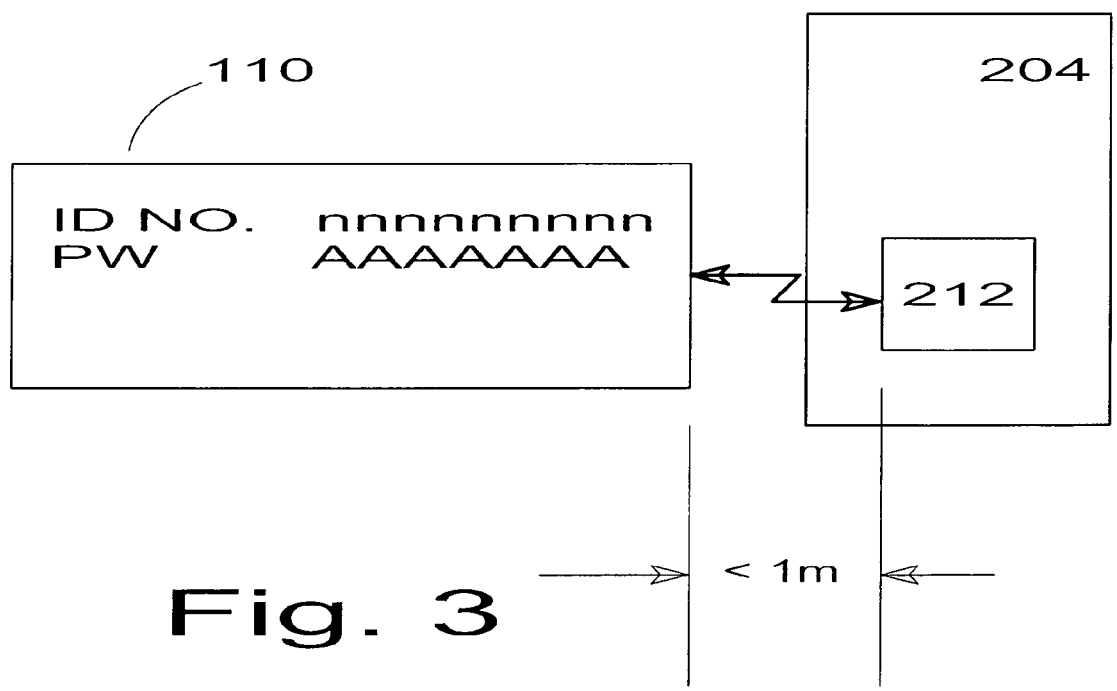
FIG. 3 illustrates reading a wireless-frequency identification tag associated with each RF relay device according to one embodiment of the present invention.

According to the present embodiment, provided with each RF chip 102 and 104 of each node 100 is an RFID tag 110, one embodiment of which is shown in FIG. 3. Means are known in the art for reading information from such a tag without any need to provide the tag with a power source or radio-frequency energy source. Typically, such a tag includes a patch antenna which, when subjected to an RF field of a frequency at which it is resonant, reflects information hard-coded within it. The patch antenna may be of a foil material so that the tag 110 may be virtually paper-thin, or alternatively tag 110 may include a bar code or other scannable print and/or a magnetic strip and reader 212 incorporates appropriate means for reading the tag, such as a bar code reader, an optical character reader, or a magnetic strip reader. In the present embodiment, with further reference to FIG. 3, reader 212 includes an RF transmitter of sufficiently low power that no sensible reflection is obtained from a tag 110 unless the tag 110 is within a distance of one meter. Reader 212 also includes a receiver for reading the data on or incorporated into tag 110. The data coded in the tag 110 may include, for purposes of the present invention, the Bluetooth ID number of the Bluetooth chip with which the tag 110 is associated and a temporary password known to the Bluetooth chip. The tag 110 may contain additional information pertaining to its associated chip, such as the chip's serial number. According to the present invention, at least the Bluetooth ID number and the password for each chip 102 and each chip 104 are stored in node transceiver list 222 of network host 204.

To ready a new network for operation, after physically mounting the nodes 100 in their intended positions, the tags 110 are presented to reader 212, and all the resultant ID numbers and passwords are stored in node transceiver list 222. Host 204 then pages the stored ID numbers. In a typical network (covering an area larger than the coverage area of any one RF chip), not all the paged chips will be within range of the page from host 204. Thus, only the paged chips within the coverage area of the host 204 will respond. In the exemplary network of FIG. 2, nodes 100-1 and 100-2 are within the coverage area of chip 208 in host 204, and nodes 100-3 and 100-4 are not. Nodes 100-1 and 100-2 are thus primary nodes and will respond to the page from the host 204. It is further supposed that node 100-3 is within range of node 100-1 and that node 100-4 is within range of node 100-2. Nodes 100-3 and 100-4, being within the range of primary nodes 100-1 and 100-2 respectively, are thus secondary nodes. Other networks may be contemplated which include tertiary nodes, and so forth. In practice, host 204 should be located as centrally as possible among nodes 100 to maximize the number of nodes that are primary nodes. There will thus be fewer nodes that must communicate with the host by relaying through other nodes, and the overall speed of the system is thus increased. A-2 FIGS. 4A–4F depict the physical arrangement of the exemplary network block-diagrammed in FIG. 2. Locations of host 204 and satellites nodes 100-1 through 100-4 are shown in each of FIG. 100-4. 4A through 4F. FIG. 4A shows the RF coverage areas of host 204 and the four said nodes. FIG. 4B shows only the coverage area of host 204; FIG. 4C, node 100-1; FIG. 4D, node 100-2; FIG. 4E, node 100-3; FIG. 4F shows only the coverage area of node The RFID tags 110 for the eight chips 102 and 104 in the exemplary network 200 might have been presented to tag reader 212 in any order, so the ID's and corresponding passwords may appear in storage 206 in any order, and thus chips may be paged in any order. An order is arbitrarily assumed here for purposes of example, and is shown in Table 1.

TABLE 1

| ID & PW for Chip |
|---|
| 104-4 |
| 102-2 |
| 104-1 |
| 104-2 |
| 104-3 |
| 102-3 |
| 102-1 |
| 102-4 |

Host 204 pages the chips in the order in which they appear in node transceiver list 222, i.e., the order given in Table 1. Information garnered as a result is incorporated into the node transceiver list 222 as shown in Table 2. Table 2 includes an additional column headed "(Path Identified)"; this is provided for correlation, for reference purposes, with paths shown in FIG. 2 and does not represent any actual contents of node transceiver list 222.

The first chip identified in node transceiver list 222 is chip 104-4 (chip 104 of node 100-4). Chip 104-4 is paged, but since node 100-4 is out of range of host 204 in the present example, no answer is received and there is no entry made in node transceiver list 222.

The next chip paged is chip 102-2. Node 100-2 is within range, so chip 102-2 answers, and by virtue of being the first chip within node 100-2 to answer a page, chip 102-2 is identified as the slave chip within node 100-2, and conversely chip 104-2 is designated the master within node 100-2. (Had the aforementioned tags 110 been presented to reader 212 in a different order so that chip 104-2 was the first chip paged within node 100-2, then chip 104-2 would have been designated the slave and 102-2 the master.) Host 204 then forwards to slave chip 102-2 the password for chip 102-2. Chip 102-2 will not proceed until receiving a valid password. This prevents chip 102-2 from becoming the slave of a pirate host that paged its ID, perhaps as part of a scheme of trying all possible ID's. Slave chip 102-2 reports the ID of chip 104-2 to host 204, is signaling that chip 104-2 is co-resident with it in node 100-2 and that 104-2 is the master. This information regarding the presence of the two chips in node 100-2 and their designation as slave and master is recorded in node transceiver list 222 as shown in Table 2. It is also recorded in node transceiver list 222 that slave 102-2 is one "hop" from the host. Table 2 shows that path 501 (FIG. 2) has been identified, but as noted, this is shown in Table 2 for reference and does not represent any actual content of node transceiver list 222.

The next chip paged is chip 104-1. Since node 100-1 is within range of host 204 in the present example, chip 104-1 answers, is designated the slave in node 100-1, receives and verifies its password, and reports the ID of chip 102-1 as the master chip in node 100-1. This information is also recorded in node transceiver list 222, as shown in Table 2.

TABLE 2

| ID & PW for Chip | Slave/Master | Hops to Host | (Path Identified) |
|---|---|---|---|
| 104-4 | | | |
| 102-2 | S | 1 | 501 |
| 104-1 | S | 1 | 502 |
| 104-2 | M | | |
| 104-3 | | | |
| 102-3 | | | |
| 102-1 | M | | |
| 102-4 | | | |

The next chip ID appearing in node transceiver list 222 is that of chip 104-2. Since that chip is already known to be a master, it is not paged by host 204. (Alternatively, it may be paged, but it will not answer because it is designated to be a master and thus does not answer pages.) There is thus no change to the contents of node transceiver list 222.

The next chips paged are 104-3 and 102-3. Since node 100-3 is out of range of host 204 in the present example, neither answers and there is no change to the contents of node transceiver list 222.

The next chip identified in node transceiver list 222 is chip 102-1, already identified as a master. The final chip identified is 102-4, out of range. Thus, after host 204 has processed the list of ID's in node transceiver list 222, the contents are as depicted in Table 2.

The contents of node transceiver list 222, and the ID of chip 208 in host 204, are now forwarded to data stores 108-1 and 108-2 in nodes 100-1 and 100-2 respectively. Nodes 100 and 100-2 now begin to page chips, and chip 208 goes into a mode of not answering pages. Table 3 shows the contents of data store 108-1, including additional information to be garnered by paging from node 100-1. (Paging from node 100-2 will be discussed in connection with Table 4.)

The first node ID encountered is the ID of chip 102-2. Although 102-2 is already known to the host, node 100-1 pages it and receives an answer, identifying path 503. In some embodiments, an indication of this path's existence is stored in another portion of data store 108-1 not shown in Table 3.

The next ID encountered is that of chip 104-1. This is recognized by node 100-1 as being one of its own chips, and it is not paged. The next ID encountered is that of chip 104-2, already known to be a master. Next is chip 104-3 which is paged, answers, receives and verifies its password, is designated the slave within node 100-3, and reports the ID of chip 102-3 which is thus the master within node 100-3. Data store 108-1 is updated accordingly, as shown in Table 3. Table 3 now shows that chip 104-3's Hops-to-Host value is 2. Table 3 also shows that path 504 is identified.

Next encountered is the ID of chip 102-3, just identified as a master. Next is the ID of 102-1, recognized in node 100-1 as being one of its own chips and not paged. Finally, the ID of chip 102-4 is encountered. Chip 102-4 is paged, but is out of range and does not answer. Data store 108-1 has the contents shown in Table 3.

TABLE 3

| ID & PW for Chip | Slave/Master | Hops to Host | (Path Identified) |
|---|---|---|---|
| 208 | n/a | n/a | n/a |
| 104-4 | | | |
| 102-2 | S | 1 | 503 |
| 104-1 | S | 1 | |
| 104-2 | M | | |
| 104-3 | S | 2 | 504 |
| 102-3 | M | | |
| 102-1 | M | | |
| 102-4 | | | |

Meanwhile, node 100-2 is also paging chips according to the information in its data store 108-2, which started off with a copy of the data shown in Table 2. Results of paging are tabulated in Table 4. Paging host chip 208 has no effect since the host is not answering pages at this time. Chip 1044 answers, receives and verifies its password, is designated the slave within node 100-4, and reports the ID of chip 102-4 which is thus the master within node 100-4. Data store 108-2 is updated accordingly, as shown in Table 4. Table 4 shows that chip 104-4's Hops-to-Host count is 2. Table 4 also shows that path 505 is identified.

The next ID encountered is that of chip 102-2, recognized as one of node 100-2's own chips and not paged. Next is chip 104-1, which answers, thus identifying path 506. Chip 104-2 is recognized as one of node 100-2's own chips and is not paged. Chips 104-3 and 102-3 are both out of range and do not answer. Chip 102-1 and 102-4 are already identified as masters. The state of data store 108-2 is now as shown in Table 4.

TABLE 4

| ID & PW for Chip | Slave/Master | Hops to Host | (Path Identified) |
|---|---|---|---|
| 208 | n/a | n/a | n/a |
| 104-4 | S | 2 | 505 |

TABLE 4-continued

| ID & PW for Chip | Slave/Master | Hops to Host | (Path Identified) |
|---|---|---|---|
| 102-2 | S | 1 | |
| 104-1 | S | 1 | 506 |
| 104-2 | M | | |
| 104-3 | | | |
| 102-3 | | | |
| 102-1 | M | | |
| 102-4 | M | | |

The information garnered by paging chips from nodes 100-1 and 100-2 is reported back to host 204 and is used to update node transceiver list 222, which then has contents as shown in

TABLE 5

| ID & PW for Chip | Slave/Master | Hops to Host | (Path Identified) |
|---|---|---|---|
| 208 | n/a | n/a | n/a |
| 104-4 | S | 2 | |
| 102-2 | S | 1 | |
| 104-1 | S | 1 | |
| 104-2 | M | | |
| 104-3 | S | 2 | |
| 102-3 | M | | |
| 102-1 | M | | |
| 102-4 | M | | |

The contents of node transceiver list 222 are then forwarded to data stores 108-1, 108-2, 108-3, and 108-4. Host chip 208 continues in the mode of not answering pages, nodes 100-1 and 100-2 to go into the mode of not answering pages, and nodes 100-3 and 100-4 begin to page nodes. This would find tertiary nodes, although in the network 200 of the present example there are no tertiary nodes to be found, so the paging will not be discussed chip by chip. When node 100-3 pages chip 104-4, path 507 is identified; when node 100-4 pages chip 104-3, path identified.

The exemplary network 200 has but one host 204, but those in the art appreciate that the scheme described works with a plurality of hosts 204.

After initializing the network 200, the nodes 100 periodically exchange load information for such purposes as determining optimum routings, as discussed in the aforementioned related patent application. In one embodiment, load information of a node is specified as a decimal value from 0 to 1 of the traffic capacity of the node. In the event that a node has failed or has been moved, it may appear to some or all of the other nodes that the failed or moved node does not to send load information when due, or does not respond to messages or pages. This is detected as discussed in the related patent application, and reported to host 204, which instructs all remaining nodes to recheck all connections and recalculate their "hops to host". In the event of a moved node, this will result in reconfiguring the network for the new arrangement of nodes. In the event of a failed node, the failed node will not respond, whereupon the host alerts maintenance personnel in some predetermined manner.

To add a new node 100 to an initiated network 200, the new node is mounted and powered up, and the RFID tags of its chips 102 and 104 are presented to RFID tag reader 212. The IDs and passwords thus read are added to the list in node transceiver list 222, from where they are passed to the data stores 108 of the initialized nodes 100. The host 204 pages the new node for a predetermined time, then informs the initialized nodes to page the new node. Each time the new node answers a page, data store 108 of the paging node is updated accordingly. All such updates are passed back to host 204, reflecting the links formed with the new node. After that, the host updates the tables of all the nodes of the network to reflect the role of the Bluetooth chips and "hops to host" of the new node.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in it substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the is scope of the claims appended hereto.

What is claimed is:

1. A method of configuring a short range RF network, the network comprising at least one host node and at least two wireless transceiver nodes, each transceiver node having a controller, a data store, and at least one transceiver for communicating wirelessly with other host and transceiver nodes, each transceiver having a unique identifier, the method comprising the steps of:
   (a) assigning a predetermined value to a variable n and associating the at least one host with a value of n;
   (b) paging all other nodes from the node associated with the value of n;
   (c) noting nodes which reply to paging and associating them with a value of (n+1);
   (d) making all nodes associated with the value of n or with lower values unresponsive to paging;
   (e) incrementing the value of n; and
   (f) repeating steps (b) through (e) until no nodes reply to paging;
       whereby the network is configured such that transceiver nodes beyond a transmission range of the at least one host node but within transmission range of one or more intermediate transceiver nodes accessible to said at least one host node and in wireless communication with said at least one host node become identified and accessible to said at least one host node by relaying through said intermediate transceiver nodes;
   wherein:
       control logic of each node computes an indication of current load carried by the node;
       each node dynamically transmits its load indication at least to nodes within its transmission range; and
       each node dynamically receives and stores load indications received from other nodes.

2. The method of claim 1, wherein said host node is further a gateway to another network.

3. The method of claim 1, further comprising step:
   (g) repeating steps (a) through (f) with a different host node selected as the host node.

4. The method of claim 3, wherein any host node selected as the host node is further a gateway to another network.

5. The method of claim 1, wherein the short-range RF network is a Bluetooth network.

6. The method of claim 1, wherein:
if a transceiver node comprises at least two transceivers, the first one to answer paging is designated as a slave transceiver of the RF network and least one of the other transceivers is designated as a master transceiver of the RF network, and each transceiver designated as a master does not answer paging.

7. The method of claim 6 wherein in step (b) paging is performed by the master.

8. The method of claim 1, wherein a transceiver node further includes a transceiver for communication with wireless terminals, whereby a wireless terminal in transmission range of a transceiver node may communicate with another wireless terminal in transmission range of the host node.

9. The method of claim 1, wherein a transceiver further communicates with wireless terminals, whereby a wireless terminal in transmission range of a transceiver node may communicate with another wireless terminal in transmission range of the host node.

10. The method of claim 2, wherein a the transceiver node further includes a transceiver for communication with wireless terminals, whereby a wireless terminal in transmission range of the transceiver node may communicate with another wireless terminal in transmission range of the host node or with an entity on said other network.

11. The method of claim 1, wherein each transceiver further has a password associated with it, and wherein:
in step (b), passwords are included in paging; and
the transceiver a node does not reply to paging unless the password included in paging matches the password associated with the transceiver.

12. A method of configuring a short range RF network, the network comprising a plurality of network at least one host node and at least two wireless transceiver nodes for communicating wirelessly with other host and transceiver nodes, each transceiver having a controller unit and a data store, the method comprising the steps of:
a) storing identifiers of all nodes on the network in a data store accessible to the at least one host node;
b) paging other nodes from the at least one host node;
c) detecting other nodes within a coverage area of the at least one host node by receiving responses of said detected nodes to paging;
d) updating information regarding said detected nodes according to the received responses of said detected nodes to paging;
e) associating said detected nodes with a first value of a dynamic variable, the value of the dynamic variable depending on the placement of each said detected node in the network; and
f) propagating the updated information to said detected nodes in the network;
whereby the network is configured such that transceiver nodes beyond a transmission range of the at least one host node but within transmission range of one or more intermediate transceiver nodes accessible to said at least one host node and in wireless communication with said at least one host node become identified and accessible to said at least one host node by relaying through said one or more intermediate transceiver nodes;
wherein:
control logic of each node computes an indication of current load carried by the node;
each node dynamically transmits its load indication at least to nodes within its transmission range; and
each node dynamically receives and stores load indications received from other nodes.

13. The method of claim 12, wherein each node comprises a transceiver connected to the controller unit for communicating with other transceivers, each transceiver having a unique identifier.

14. The method of claim 13, further comprising:
g) incrementing the value of the dynamic variable;
h) paging from a transceiver of each said detected transceiver node other transceivers;
i) detecting other transceiver nodes within a coverage area of the transceiver of each said detected transceiver node by receiving responses of said newly detected nodes' transceivers to paging;
j) updating information regarding said newly detected nodes' transceivers to paging;
k) associating newly detected transceiver nodes of the network with the incremented value of the dynamic variable; and
l) propagating the updated information to all detected transceiver nodes in the network.

15. The method of claim 14, further comprising repeating steps g) through l) until every transceiver node of the network is configured.

16. The method of claim 12, wherein the at least one host node selected as a control node and said control node is further a gateway to another network.

17. The method of claim 14, further comprising the step of repeating steps (a) through (l) with a different host node selected as the control node.

18. The method of claim 17, wherein any node selected as the control node is further a gateway to another network.

19. The method of claim 12, wherein the RF network is a Bluetooth network.

20. The method of claim 14, wherein:
if a node comprises at least two transceivers, the first one to answer paging is designated as a slave transceiver of the RF network and least one of the other transceivers is designated as a master transceiver of the RF network, and each transceiver designated as a master does not answer paging.

21. The method of claim 20, wherein paging is performed by the master.

22. The method of claim 14, wherein a node further includes a transceiver for communication with wireless terminals, whereby a wireless terminal in transmission range of a transceiver node may communicate with another wireless terminal in transmission range of the host node.

23. The method of claim 14, wherein a transceiver further functions to communicate with wireless terminals, whereby a wireless terminal in transmission range of the transceiver node may communicate with another wireless terminal in transmission range of the host node.

24. The method of claim 15 wherein a node further includes a transceiver for communication with wireless terminals, whereby a wireless terminal in transmission range of a transceiver node may communicate with another wireless terminal in transmission range of the host node or with an entity on said other network.

25. The method of claim 14, wherein each transceiver further has a password associated with it, and wherein:
passwords are included in paging; and
a transceiver does not reply to paging unless the password included in paging matches the password associated with the transceiver.

26. The method of claim 15, wherein further:
each transceiver has associated with it a portable machine-readable tag containing the transceiver's unique identifier;
associated with the network is a tag reader for reading the machine-readable tags; and
step (a) comprises substeps:
(a1) presenting each tag to the tag reader; and
(a2) transferring each output of the tag reader to the data store of the control node.

27. The method of claim 25, wherein further:
each transceiver has associated with it a portable machine-readable tag containing the transceiver's unique identifier and password;
associated with the network is a tag reader for reading the machine-readable tags; and
step (a) comprises substeps:
(a1) presenting each tag to the tag reader; and
(a2) transferring each output of the tag reader to the data store of the first node.

28. A self-configuring short range RF network, the network comprising:
a plurality of nodes for communicating wirelessly with other nodes of the RF network, wherein at least one of the nodes is selected as a control node, each node including:
a control logic;
a data store connected to the control logic;
at least one transceiver connected to the control logic and identified by a unique address for communicating wirelessly with other nodes of the network;
a transceiver list database connected to the data store for storing updateable information of all transceivers of the RF network for network configuration; and
a dynamic variable linked to the transceiver list database for indicating position of each node in the RF network relative to the control node,
wherein a transceiver of the control node pages other transceivers in its transceiver list; a transceiver of the control node detects other nodes within its coverage area according to response of said other transceivers to paging; the control node's transceiver list is updated according to said response of said other transceivers to paging; the control logic associates detected transceivers' information in the control node's transceiver list with a current value of the dynamic variable; and the control logic directs propagating the updated contents of the control node's transceiver list to all detected nodes in the network,
whereby the network is configured such that transceiver nodes beyond a transmission range of control nodes but within transmission range of one or more intermediate transceiver nodes accessible to a control node and in wireless communication with said control node become identified to said control node by relaying through said one or more intermediate transceiver nodes;
wherein:
the control logic of each node computes an indication of current load carried by the node;
each node dynamically transmits its load indication at least to nodes within its transmission range; and
each node dynamically receives and stores load indications received from other nodes.

29. The RF network of claim 28, wherein:
if a node comprises at least two transceivers the control logic is arranged to designate the first one to answer paging as a slave transceiver of the RF network and to designate at least one of the other transceivers as a master transceiver of the RF network, and wherein each transceiver designated as a master does not answer paging.

30. The RF network of claim 28, wherein a node further includes a transceiver for communicating with wireless terminals, whereby a wireless terminal in transmission range of a node may communicate with another wireless terminal in transmission range of another node.

31. The RF network of claim 28, wherein a transceiver further communicates with wireless terminal, whereby a wireless terminal in transmission range of a node may communicate with another wireless terminal in transmission range of another node.

32. The RF network of claim 28, wherein the control node is further a gateway to another network.

33. The RF network of claim 30, wherein the control node is further a gateway to another network, whereby a wireless terminal in transmission range of a node may communicate with a terminal on said other network.

34. The RF network of claim 28, wherein:
associated with each transceiver is a unique password;
provided with each transceiver is a machine-readable tag on which is recorded the transceiver's unique address and password, and
associated with the control node is a reader for reading the unique addresses and passwords from the tags and storing them in the first node's transceiver list.

35. The RF network of claim 28, wherein:
the control logic of each detected node directs incrementing the dynamic variable;
a transceiver of each node pages other transceivers in its transceiver list;
each node detects other nodes within the coverage area of its transceiver according to response of said other transceivers to paging;
each node's control logic directs updating the node's transceiver list according to response of said other transceivers to paging;
the node's control logic associates detected transceivers' information in the node's transceiver list with a current value of the dynamic variable; and
the control logic directs propagating the updated contents of each node's transceiver list to all detected nodes in the network.

36. The RF network of claim 35, wherein functions (g) through (k) are repeated until all nodes of the network are detected.

37. The RF network of claim 28, wherein the RF network is a short-range RF network.

38. The RF network of claim 37, wherein the short-range RF network is a Bluetooth network.

39. The RF network of claim 28, wherein a transceiver not within transmission range of a certain node communicates with the certain node by relaying through other of the nodes.

40. A self-configuring short range RF network comprising:
a plurality of nodes for communicating wirelessly with other nodes of the RF network, wherein at least one of the nodes is selected as a control node, each node including:
a control logic;
a data store connected to the control logic;
at least one transceiver connected to the control logic and identified by a unique address for communicating wirelessly with other nodes of the network;

a transceiver list database connected to the data store for storing updateable information of all transceivers of the RF network for network configuration; and a dynamic variable linked to the transceiver list database for indicating position of each node in the RF network relative to the control node;

wherein associated with each transceiver is a unique password, provided with each transceiver is a machine-readable tag on which is recorded the transceiver's unique address and password, and associated with the control node is a reader for reading unique addresses and passwords from the tags and storing them in a first node's transceiver list, wherein the network is configured such that:

(a) a transceiver of the control node pages other transceivers in its transceiver list;

(b) a transceiver of the control node detects other nodes within its coverage area according to response of said other transceivers to paging;

(c) the control node's transceiver list is updated according to said response of said other transceivers to paging;

(d) the control logic associates detected transceivers' information in the control node's transceiver list with a current value of the dynamic variable; and (e) the control logic directs propagating the updated contents of the control node's transceiver list to all detected nodes in the network; and (f) the control logic of each detected node directs incrementing the dynamic variable;

(g) a transceiver of each node pages other transceivers in its transceiver list;

(h) each node detects other nodes within the coverage area of its transceiver according to response of said other transceivers to paging;

(i) each node's control logic directs updating the node's transceiver list according to response of said other transceivers to paging;

(j) the node's control logic associates detected transceivers' information in the node's transceiver list with a current value of the dynamic variable;

(k) the control logic directs propagating the updated contents of each node's transceiver list to all detected nodes in the network; and functions (g) through (k) are repeated until all nodes of the network are detected; and wherein the control logic of each node computes an indication of current load carried by the node;

each node dynamically transmits its load indication at least to nodes within its transmission range; and each node dynamically receives and stores load indications received from other nodes.

41. The RF network of claim 40, wherein the control logic of each node dynamically calculates routes for transmitting messages to the first node including relays through other nodes for nodes not within transmission distance of the control node.

42. The RF network of claim 41 wherein a node not within transmission distance of the control node selects routes to the first node traversing the fewest other nodes.

43. The RF network of claim 42 wherein if several routes traverse the fewest other nodes, a route is selected which has traverses nodes having least aggregate load indication.

44. A node for use in a self-configuring short range RF network, comprising:

a backbone transceiver identified by a unique address and associated with a password, for communicating with other nodes of the network; and control logic configured to compute an indication of current load carried by the node and detect when the backbone transceiver receives a paging message directed to its unique address, and in response, to direct that:

a password received in the paging message be verified as the password associated with the backbone transceiver;

a node transceiver list received in the paging message, containing addresses and passwords of other nodes in the network, be received and stored;

a value "n" of a dynamic variable received in the paging message be received and stored;

the node becomes unresponsive to further paging messages;

the node dynamically transmits its load indication at least to nodes within its transmission range;

the node dynamically receives and stores load indications received from other nodes; and the network is configured such that transceiver nodes beyond a transmission range of the node but within transmission range of one or more intermediate transceiver nodes accessible to the node and in wireless communication with said node become identified and accessible to the node by relaying through said one or more intermediate transceiver nodes.

45. The node of claim 44, further comprising a second backbone transceiver, and wherein the control logic is further configured to direct that:

the backbone transceiver which received the paging message is designated a slave transceiver;

the other backbone transceiver is designated a master transceiver;

the value "n" of the dynamic variable is incremented;

the master transceiver transmits to each transceiver in the node transceiver list a paging message including:

the paged transceiver's password;

the node transceiver list; and the value of the dynamic variable.

46. The node of claim 44, comprising a transceiver for communicating with mobile terminals, whereby a mobile terminal in transmission range of a node may communicate with another mobile terminal in transmission range of another node.

47. The node of claim 44, wherein a backbone transceiver also communicates with mobile terminals, whereby a mobile terminal in transmission range of a node may communicate with another mobile terminal in transmission range of another node.

48. The node of claim 44 wherein the backbone transceivers are short-range RF transceivers.

49. The node of claim 48 wherein the transceivers are Bluetooth transceivers.

50. A self-configuring short range RF network, the network comprising:

a plurality of nodes for communicating wirelessly with other nodes of the RF network, wherein at least one of the nodes is selected as a control node, each node including:

a control logic;

a data store connected to the control logic;

at least one transceiver connected to the control logic identified by a unique address for communicating wirelessly with other nodes of the network either directly or through one or more relay nodes; and software means operative on the control logic for:

maintaining in the data store a transceiver list database containing updateable information of all transceivers of the RF network for network configuration;

indicating, with a dynamic variable linked to the transceiver list database, position of each node in the RF network in relation to the control node;

periodically communicating wirelessly among the nodes of the RF network for exchanging updated configuration information and dynamic variable information; and updating current network configuration information and dynamic variable information within the data store;

whereby the network is configured such that transceiver nodes beyond a transmission range of at least one control node but within transmission range of one or more intermediate transceiver nodes accessible to said at least one control node and in wireless communication with said at least one control node become identified to said at least one control node by relaying through said one or more intermediate transceiver nodes;

wherein:

the control logic of each node computes an indication of current load carried by the node;

each node dynamically transmits its load indication at least to nodes within its transmission range; and each node dynamically receives and stores load indications received from other nodes.

51. The RF network of claim 50, wherein the software means is further operative for determining, according to dynamic variable information, a route traversing the fewest nodes from a node to the control node.

52. The RF network of claim 51, wherein the software means is further operative for:

dynamically updating load information of a node and at least nodes within communication distance of the node; and selecting, according to load information, a route traversing least loaded nodes from among two or more routes traversing equal numbers of nodes from a node to the control node.

53. A method of configuring short range RF network, the method comprising the steps of:

electronically maintaining, for network configuration, a transceiver list database containing updateable information regarding all transceivers of the RF network;

indicating a position of each node in the RF network in relation to a control node with a dynamic variable linked to the transceiver list database;

periodically communicating wirelessly between nodes of the RF network for exchanging updated configuration information and dynamic variable information; and updating current network configuration information and dynamic variable information within the transceiver list database;

whereby the network is configured such that transceiver nodes beyond a transmission range of at least one control node but within transmission range of one or more intermediate transceiver nodes accessible to said at least one control node and in wireless communication with said at least one control node become identified and accessible to said at least one control node by relaying through said one or more intermediate transceiver nodes;

wherein:

control logic of each node computes an indication of current load carried by the node;

each node dynamically transmits its load indication at least to nodes within its transmission range; and each node dynamically receives and stores load indications received from other nodes.

* * * * *